Jan. 22, 1952     A. MORICI     2,583,116
ANIMAL TRAP
Filed June 17, 1949
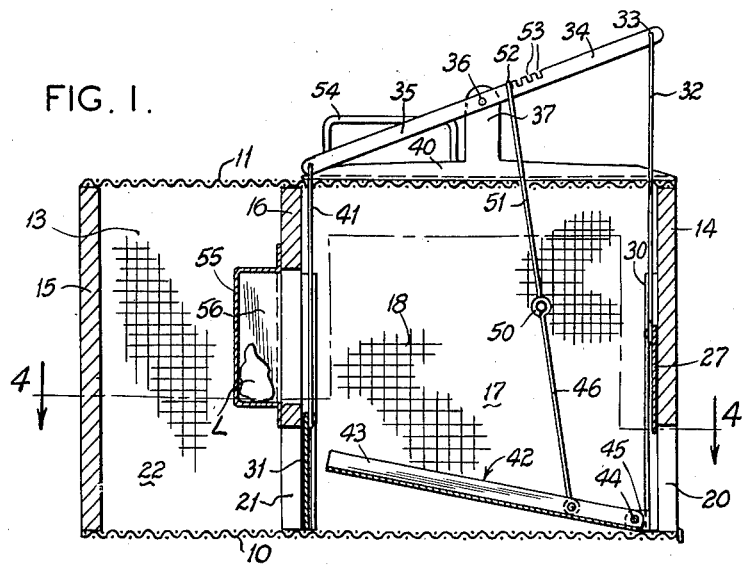
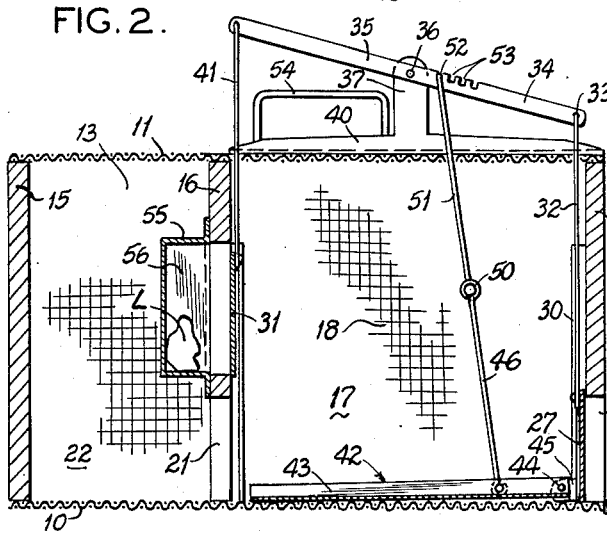
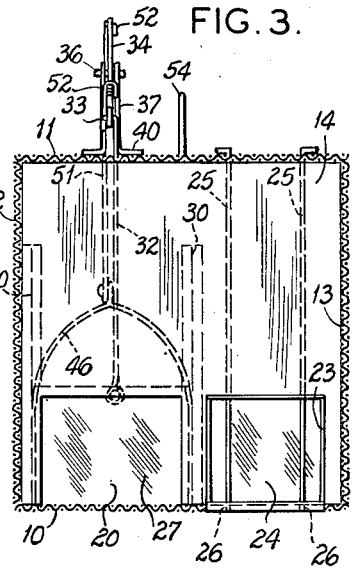
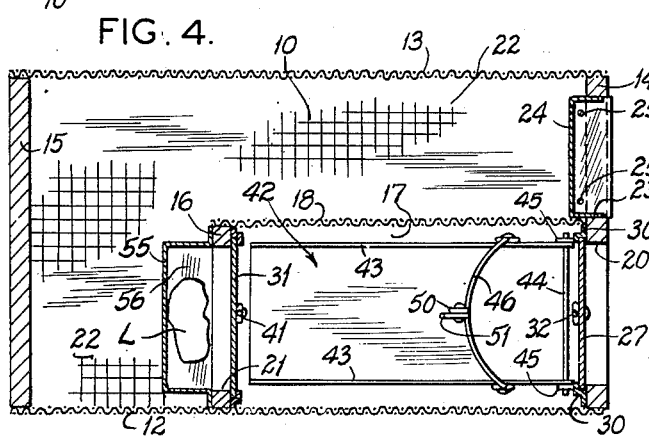
INVENTOR;
ANTONINO MORICI
BY *Robert B. Terry*
ATTORNEY.

Patented Jan. 22, 1952

2,583,116

UNITED STATES PATENT OFFICE 2,583,116

ANIMAL TRAP

Antonino Morici, St. Louis, Mo.

Application June 17, 1949, Serial No. 99,633

2 Claims. (Cl. 43—67)

This invention relates to improvements in animal traps, and more particularly to an improved live type of trap characterized by automatic setting provisions and suitable for a variety of smaller animals, being presently designed particularly for the entrapment of rodents, such as rats.

This designer is aware that numerous attempts have heretofore been made toward the design of cage-type rodent traps, in many of which automatic setting and resetting provisions are embodied. All such devices, as far as is known at this writing, possess the disadvantages of undue complication leading to a high production cost, the requirement of frequent service attention, and an inability to maintain the trap in an acceptably sanitary condition. It is accordingly a principal objective of the invention to overcome the several shortcomings heretofore experienced with older cage types of rodent traps.

The present invention may be summarized as usually embodied in a cage-like structure or enclosure, provided with an entrance corridor, the latter being provided with oppositely actuated end doors, and by preference the trap being characterized by a lure box so located and subject to such control that the lure is exposed to attract the rodent, but soon after entrapment of the animal, the lure box is closed or at least shielded from access by the victim, thus preventing olfactory contamination, and enhancing the useful life or service period of the lure. The lure container in a preferred form is opened and closed automatically by one of the corridor closures, thus attaining the result noted, substantially without added parts or structural complication.

Numerous functionally advantageous features in addition to those above mentioned, include a structurally simple arrangement of but a few moving parts in such manner as to obviate the need for springs, catches, triggers, latches and the like, and further such as to enable a quick and easy manual adjustment of the moving parts to care for animals of different weight ranges.

A further important general objective in the design of the present trap, is realized in a construction such that the trap may be immersed in water or other liquid between periods of use, or otherwise treated without damage, to destroy the remanent animal scents between successive periods of usage, thereby considerably enhancing the effectiveness of the trap.

The foregoing and numerous other objects and advantages will more clearly appear from the following detailed description of a currently presented embodiment of the invention, particularly when considered in connection with the accompanying drawing, in which:

Fig. 1 is a longitudinal sectional elevation as taken in a vertical plane parallel to and just inwardly of the vestibule side of the trap or cage assembly;

Fig. 2 is a view similar to Fig. 1, Fig. 1 showing the trap in a set position ready to receive the rodent or other animal, and Fig. 2 showing the moving parts in their relative positions assumed when the animal is in the entrance vestibule to be described;

Fig. 3 is a front view of the trap showing the locations of an entrance door, and a side door employed for clearance of the compound, and Fig. 4 is a sectional elevational view taken in staggered horizontal planes, the locations of which are indicated by line 4—4 of Fig. 1.

Referring now by characters of reference to the drawing, although the cage may be constructed of any of a variety of materials such as sheet metal, wire cloth or screen, or even of sheet plastic, wood or products of same, it is preferred for low cost, durability and ease of treatment without destructive effects between periods of use, to employ a combination of wood and wire wall and partition elements, as will appear.

In the present example a cage structure of a generally rectangular form in plan includes a bottom 10, a top structure 11, and side walls 12 and 13 of a heavy grade of hardware cloth or the like. The top, bottom and sides are secured to a front closure piece 14 and a generally corresponding rear closure element 15, each consisting preferably of a wood or plywood panel.

The interior of the resulting rectangular enclosure is divided as by a partial partition 16 at the inner end of a rectangular corridor or vestibule 17, the lateral partitioning of which is completed by a vertical inner wire wall 18.

At the entrance end of the vestibule is shown a rectangular entrance opening 20, and at the opposite end of the vestibule a corresponding opening 21 is formed in or below the partial partition 16. The door opening 21 provides for communication between the vestibule 17 and an L shape compound or confinement space for the trapped animals such as rodents, such entrapment space being indicated at 22.

Alongside but spaced somewhat from the entrance door 20 is a discharge or clearance door opening 23. This latter is, during periods of usage of the cage, kept closed as by a channelled sheet-metal door structure 24 which is kept secured in place as by a pair of vertical locking rods 25 each provided with an outturned end, and each extended through suitable apertures therefor in the channelled door 24 and socketed as at 26 into a base portion of the front closure element 14.

The moving parts of the assembly include in the example shown, a vertically reciprocable sheet metal closure element or door such as 27, the opposite sides of which are guidedly constrained to a vertical movement as by channel guides 30, best appearing in Fig. 4. A similar reciprocable plate element or door is indicated at 31 and may be provided with a similar guide structure, the door or plate 31 normally, as in Fig. 1, reposing in a position to block the opening 21 in partition 16 at which time, as will appear, the door 27 normally reposes in an open or raised position.

It will have appeared from the foregoing relation of the doors controlling the opposite ends of the vestibule 17, that the elements 27 and 31 are constrained to an opposite reciprocal actuation, or otherwise expressed, the door 27 will move toward closed position as the door 31 is moved toward opening position. This result is realized with a simple form of interconnecting linkage structure exemplified presently as including a link 32 secured to the upper portion of the door 27 and at the outer end of the link, pivotally secured as at 33 to the forwardmost end 34 of a rockable beam; the opposite or rearmost end 35 completes this beam structure. The beam is apertured at or near its midpoint to receive a short shaft or pin 36 carried by an apertured bearing arm portion 37 of a bracket, the base of which is indicated at 40 and which is conveniently mounted on the top of the vestibule portion of the cage, and with the beam located substantially in a vertical longitudinal plane through the vestibule.

The inner arm 35 of the beam is apertured near its innermost end, for pivotal engagement with a link 41, the lowermost end of which is connected pivotally, to the top of the door or closure 31.

Located so as to form a preferably imperforate movable bottom element of the vestibule 17, is a treadle or depressible platfrom generally indicated at 42. By preference the treadle 42 is of a shallow channel form with upstanding marginal flanges at its opposite sides shown at 43, these latter being perforated close to their forwardmost ends to receive a pivot pin 44, the end of which are journalled in fixed pivot ears 45.

Pivotally connected to the depressible platform 42 at a point slightly rearwardly of the pivot rod 44, is an inverted U-shaped member or bail 46 which may conveniently be formed of a tolerably heavy wire or rod stock and centrally of the bight of which is an eye 50 which receives the lowermost hook end of an operating link 51. This latter is provided at its upper end with a hook formation 52 (Figs. 1 and 3) which hook is adapted selectively to be seated into one of a linear series of hook slots or seats 53 for adjustment purposes, as will appear. A carrying handle in the form of a suitably flanged inverted U-shape element of rod stock is located centrally of the top of the cage and is indicated at 54.

A particularly advantageous feature, as has been developed by experience in usage, consists of the location and functional usage of the lure or bait box. According to present preference, this feature consists of a relatively shallow, vertically mounted, open front, sheet metal container the box portion of which is indicated at 55, the chamber 56 within which serves as a holder for the bait or lure L. The lure is exposed to the sight and scent of the animal when the trap is in set position, as shown by Fig. 1, the lure being directly exposed to view through the door opening 20 under these conditions, and with the treadle or depressible platform 42 directed as a ramp leading to the open face of the lure box from the access door. As will now have appeared, upon approach of the animal to the lure, the door 31 is raised over the front of the lure box, and thus will effectively prevent contact between the lure and mouth or any part of the body of the rodent or other animal at any time. It will have been noted from Figs. 1 and 2 that the access opening to the chamber 56 containing the lure, is presented in a plane parallel and adjacent to the plane of movement of the door 31, by reason of which provision the door 31 will serve alternately and sequentially, as a closure for both the opening 21 to the compound, and the access opening to the lure or bait.

It is a preference as making for certainty of resetting actuation of the movable parts, and as obviating any need for springs, counterweights or the like as such, so to proportion either the relative length of the beam elements 34—35 or the weights of the doors 27 and 31 in such manner that the beam and connected parts are preponderantly overbalanced or overweighted to the rear of the pivot 36. This fact assures that, except when the treadle 42 is subjected to the weight of the animal, the inner vestibule door 31 will occupy a closed position and the access door 27 will be fully open. This out-of-balance condition is further such that treadle 42 when underweighted, will occupy a raised position as shown by Fig. 1.

The function in usage of the several elements of the trap assembly is thought now to have become apparent from the description of parts, but it may be noted for completeness that the animal, attracted by the scent, appearance, or both, of the lure L, will approach the access opening 20 and will proceed therethrough to a position upon this depressible platform. The weight of the animal is then sufficient through the linkage including bail 46 and member 51, to depress the arm 34 and accordingly to lower the door 27 to a position to block the opening 20. At the same time, the door 31 is lifted to clear the opening 21, as the treadle is lowered. When the treadle is brought to a horizontal position such as shown by Fig. 2, the lure box is closed, the opening 21 fully cleared. The width of the vestibule 17 is preferably such as to render it difficult if not impossible, for the rodent to turn around or reverse his position. Even were he to do so, his weight would keep the door 27 closed, and the only avenue of escape is thus through the opening 21 into the compound 22. As soon as the animal moves fully through door 21, the treadle 42 is relieved of his weight, and the overbalanced condition of the beam and connected system, restores the parts to the relations thereof as shown by Fig. 1 in which the trap is again fully set for reception of the next animal. As will be obvious from Fig. 1, the treadle 42 will coact with door 31 during opposite movement of these parts, to prevent backward escape of any animals earlier entrapped in chamber 22.

It should be noted that, in the event the compound chamber 22 becomes fully occupied by entrapped rodents or other animals it becomes impossible for the last entrant to clear the treadle and thus impossible for the door 27 to be opened until the trap is cleared. This latter is accomplished as above noted, by lifting the rod elements 25, removing the closure 23 and disposing of the occupants according to whether their preservation or their destruction is indicated.

It should be understood of course that the trap may be produced in larger or smaller sizes, and that it may be reproportioned with only minor changes, so as to render it valuable for entrapment not only of rats but of certain of the fur bearing or other animals.

Although the invention has been described by detailed reference to a single exemplary embodiment, the detail of description should be understood as instructive rather than restrictive, numerous variants being possible within the general principles herein outlined, and within the full intended scope of the claims hereunto appended.

I claim as my invention:

1. In a trap of live cage and self-setting type for rodents and small animals, a cage structure of a generally rectangular plan, and including side walls and front and rear walls, a partial vertical partition within the cage and a second partial partition, said two partitions coacting to form an entrance corridor within the cage structure, the first said partition and the front wall of the cage being provided with substantially respaced openings and the front wall further being provided with a clearing opening, a vertically slidable door for each of said openings, a treadle within the entrance corridor, a pivot for said treadle, and about which the treadle is arcuately movable or depressible under the weight of an animal in the corridor, a bracket above the corridor, a rockable beam pivotally carried by said bracket, a link connecting the front end of said beam to the door controlling the entrance opening, a link connecting the rear end portion of the beam to the door controlling the innermost corridor door, a bail secured to the treadle somewhat spaced rearwardly from the treadle pivot axis, a link connecting the bail to the forward end of the beam, such end of the beam having a series of notches adapted selectively as seats for the outer end of said link whereby to vary the spacing of the link connection with respect to the beam pivot, the weight of the elements connected to, and the inner end of said beam appreciably exceeding the weight of the elements operatively connected to, and the forward end of the beam, such that the inner end of the beam is normally depressed, and the door carried thereby normally closes the inner corridor opening, a box for a bait or a lure above and adjacent to the door serving the inner end of the corridor, the corridor doors being directly positively actuated and oppositely reciprocable under the action of the treadle and the beam, and said inner corridor door being so located that, as the inner corridor opening is cleared by the door therefore, said door moves upwardly toward a position to close the said lure box.

2. In a trap of live cage self-setting type for rodents and small animals, a cage structure of a generally rectangular plan, and including side walls and front and rear walls a partial vertical partition within the cage and a second partial partition at a right angle thereto, said two partitions coacting to form an entrance corridor within the cage structure, the first said partition and the front wall of the cage being provided with substantially spaced openings and the front wall further being provided with a clearing opening, a door for each of said openings, a treadle within, and which is substantially the internal length of the entrance corridor, a pivot for said treadle near the entrance opening to the corridor, and about which the treadle is arcuately movable or depressible under the weight of an animal in the corridor, a bracket above the corridor, a rockable beam pivotally carried by said bracket, a link connecting the front end of said beam to the door controlling the entrance opening, a link connecting the rear end portion of the beam to the door controlling the innermost corridor door, a bail secured to the treadle somewhat spaced rearwardly from the treadle pivot axis, a link connecting the bail to the forward end of the beam, such end of the beam having a series of open notches adapted selectively as seats for the outer end of said link whereby to vary the spacing of the link connection with respect to the beam pivot, the weight of the elements connected to, and the inner end of said beam appreciably exceeding the weight of the elements operatively connected to, and the forward end of the beam, such that the inner end of the beam is normally depressed, and the door carried thereby normally closes the inner corridor opening, both said doors being directly operatively connected by said links and bail, to the treadle so as to be positively operated by the weight of an animal thereon, a box for a bait or a lure carried by the first said partition and above and adjacent to the door serving the inner end of the corridor, the corridor doors being oppositely vertically reciprocable under the action of the treadle and the beam, and said inner corridor door being so located that, as the inner corridor opening is cleared by the door therefor, said door moves toward a position to close the said lure box and the inner end of the treadle coacts with the last said door during opening thereof, to prevent return of animals previously entrapped.

ANTONINO MORICI.

REFERENCES CITED

The following references are of record in the file of this patent:

UNITED STATES PATENTS

| Number | Name | Date |
|---|---|---|
| 87,945 | Kintz | Mar. 16, 1869 |
| 431,856 | Smith | July 8, 1890 |
| 1,347,130 | Stevenson | July 20, 1920 |
| 2,484,452 | Grossi | Oct. 11, 1949 |